United States Patent [19]

Pedrick et al.

[11] Patent Number: 4,513,801
[45] Date of Patent: Apr. 30, 1985

[54] BAND GRIPS

[76] Inventors: Joseph F. Pedrick; George Spector, both of 233 Broadway, RM 3615, New York, N.Y. 10007

[21] Appl. No.: 588,065

[22] Filed: Mar. 9, 1984

[51] Int. Cl.³ .............................................. B60C 27/02
[52] U.S. Cl. ................................ 152/213 R; 24/20 LS; 24/276; 24/279; 152/218; 152/222
[58] Field of Search ................... 152/208, 213 R, 214, 152/216, 217, 218, 221, 222, 225 R, 225 C, 226, 227, 228; 24/68 R, 68 C, 68 D, 69 AT, 220, 237, 20 LS, 20 TT, 274 WB, 279; 81/15.8

[56] References Cited

U.S. PATENT DOCUMENTS

| 1,659,044 | 2/1928 | Nelson | 152/219 |
| 1,965,887 | 7/1934 | Farkas | 152/222 |
| 2,085,204 | 6/1937 | Sullivan | 152/221 |
| 4,286,361 | 9/1981 | MacKenzie | 24/20 LS X |
| 4,334,569 | 6/1982 | Jacob et al. | 152/218 X |
| 4,402,357 | 9/1983 | Granryd | 152/218 X |

Primary Examiner—William A. Powell
Assistant Examiner—Thomas Bokan

[57] ABSTRACT

A gripping device for motor vehicle tires is provided and consists of a band of flexible material that has a plurality of ground gripping outward deformations and a worm-gear hose clamp type drive assembly for securing the band in place across the tread of the tire.

4 Claims, 9 Drawing Figures

BAND GRIPS

BACKGROUND OF THE INVENTION

The instant invention relates generally to traction devices for tires and more specifically it relates to a gripping device for motor vehicle tires.

If a person wants to install conventional tire chains consisting of an apparatus which entirely encircles the wheel and tire of the vehicle, the vehicle must be jacked up. This can be most inconvenient during the winter time in the middle of a snow storm. This situation is not desirable so accordingly it is in need of an improvement.

Numerous traction devices have been provided in prior art that are adapted to be placed around tires. For example, U.S. Pat. Nos. 1,585,336; 2,085,204 and 3,192,983 all are illustrative of such prior art.

While these units may be suitable for the particular purpose to which they address, they would not be suitable for the purposes of the present invention as heretofore described.

SUMMARY OF THE INVENTION

A principle object of the present invention is to provide a gripping device for motor vehicle tires that fits around wheel to transport vehicle through ice and snow safely.

Another object is to provide a gripping device for motor vehicle tires that can be applied to or removed from the wheel quickly without jacking or hoisting up vehicle even during snow or ice storm in a minimum amount of time.

An additional object is to provide a gripping device for motor vehicle tires that does not require special tools for installing the device to the wheel of the vehicle.

A further object is to provide a gripping device for motor vehicle tires that is simple and easy to use.

A still further object is to provide a gripping device for motor vehicle tires that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
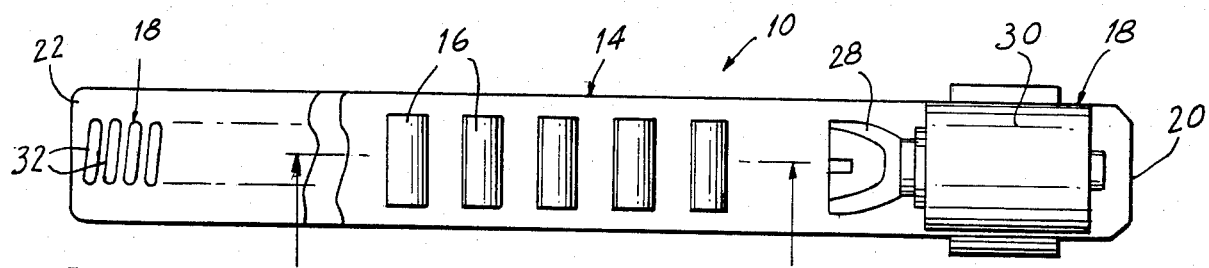
FIG. 1 is a top plan view with parts broken away of the invention in a flat position.
Figure 2:
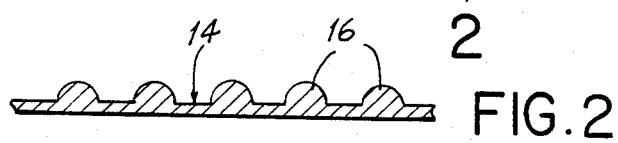
FIG. 2 is a cross sectional view taken along line 2—2 in FIG. 1.
Figures 3, 4, 5:
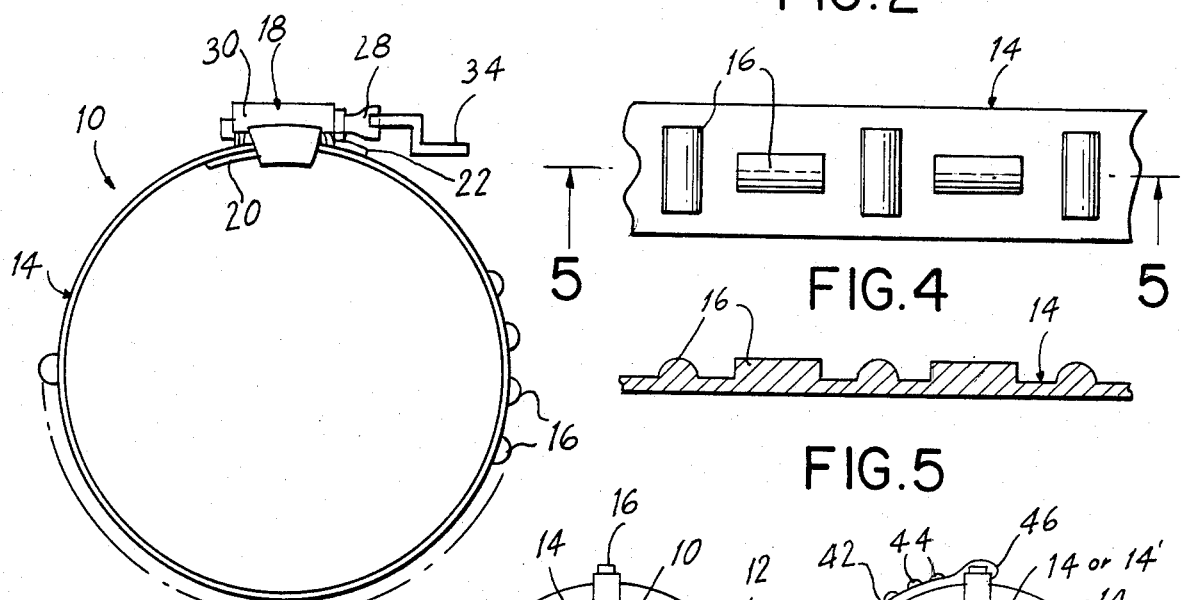
FIG. 3 is a side view of the invention in a connected position.
FIG. 4 is a partial top plan view of a first modification showing a different pattern of cleats.
FIG. 5 is a cross sectional view taken along line 5—5 in FIG. 4.

Turning now descriptively to the drawings, in which similar reference characters denote similar elements throughout the several views, FIGS. 1 through 5 and 8 illustrates a gripping device 10 for a motor vehicle tire 12 and consists of an elongated band 14 of flexible material that has a plurality of ground gripping outward deformations 16, such as cleats or the like that can be formed or punched out of the band 14. The deformations 16 can be uniformly positioned on the band 14 as shown in FIGS. 1 and 2 or of a varied pattern as shown in FIGS. 4 and 5.

Figures 8, 9:
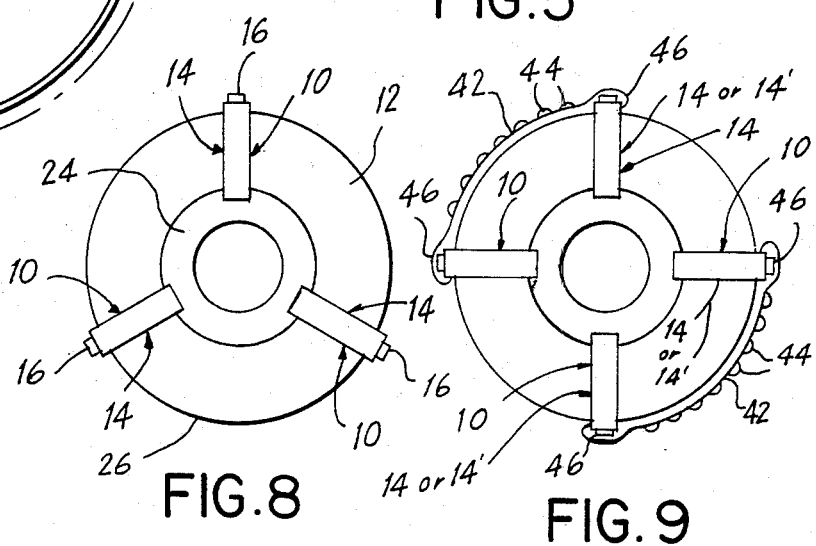
FIG. 8 is a diagrammatic side view of a tire showing three bands secured thereon.
FIG. 9 is a diagrammatic side view of a tire showing four bands secured thereon and two longitudinal connector straps with cleats connected between the bands.

A worm-gear hose clamp type drive assembly 18 is provided for interconnecting respective ends 20 and 22 of the band 14 for securing the band 14 about the tire 12, mounted on a vehicle wheel 24 with the ground gripping outward deformations 16 in place across tread 26 of the tire 12. In FIG. 8 three such devices 10 are shown secured as described above.

The worm-gear hose clamp type drive assembly 18 consists of a screw 28 that rotates within a housing 30 mounted to end 20 and a plurality of angular slots 32 within end 22 of the band 14. The threads (not shown) of the screw 28 engages the slots 32 when end 22 is placed over end 20 so that the band 14 can be adjusted for different size tires 12. A little crank handle 34 can be attached to the screw 28 (as shown in FIG. 3) to rotate the screw 28 of the assembly 18.

Figure 6:
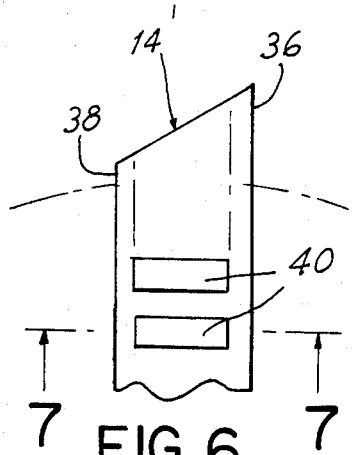
FIG. 6 is a partial top plan view, of a second modification being wrapped around a tire showing the band conical shaped.
Figure 7:
FIG. 7 is a cross sectional view taken along line 7—7 in FIG. 6 showing one of the reinforcing struts.

FIGS. 6 and 7 shows a modified band 14' that is inclined to form a conical shape having one edge 36 higher than other edge 38. The band 14' has a plurality of integral formed reinforced struts 40 punched out and bent downwardly from the higher edge 36 to support the conical shape band 14'.

The gripping device 10 can further contain a longitudinal flexible strap 42 that has a plurality of ground gripping outward deformations 44 such as cleats or the like and a hook portion 46 at each end of the strap 42. Each hook portion 46 can engage a band 14 or 14' of the gripping device 10 thus placing the strap 42 between two gripping devices 10 secured about a tire 12. In FIG. 9 two straps 42 and four gripping devices 10 are illustrated to increase the gripping action.

The bands 14 and 14' and strap 42 can be made of flexible stainless steel, rubber, plastic or any other durable quality material that will hold up in use.

The gripping device 10 can be mounted to the tire 12 by opening the assembly 18 and placing end 22 through a slot in rim of wheel 24, brought around the tire 12, then threaded back into the assembly 18 and threaded tightly the exact same way as would a standard hose clamp, with the ground gripping outward deformations 16 across the tread 26 of the tire 12. When the strap 42 has to be mounted to the tire 12 a first gripping device 10 is placed loosely around the tire 12 and a second gripping device 10 is also placed loosely around the tire 12. Then each hook 46 of the strap 42 are placed in engagement with a band 14 or 14' of each gripping device 10. The two gripping device 10 are then positioned and tightened to hold the strap 42 in place.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A gripping device for a motor vehicle tire which comprises:
    (a) an elongated band of flexible material having a plurality of ground gripping outward deformations; and
    (b) means for interconnecting respective ends of said band for securing said band about the tire, mounted on a vehicle wheel with the ground gripping outward deformations in place across tread of the tire wherein said means for interconnecting respective ends of said band being a worm-gear hose clamp type drive assembly.

2. A gripping device as recited in claim 1, wherein said worm-gear hose clamp type drive assembly further comprises a little crank handle attached thereto to rotate a screw of said assembly.

3. A gripping device as recited in claim 2, wherein said band being inclined to form a conical shape having one edge higher than other edge, said band having a plurality of integral formed reinforced struts punched out and bent downwardly from the higher edge to support said conical shape band.

4. A gripping device as recited in claim 3, that further comprises at least one longitudinal flexible strap having a plurality of ground gripping outward deformations and a hook portion at each end of said strap so that each said hook portion can engage a said band of a said gripping device thus placing said strap between two said gripping devices secured about a tire.

* * * * *